Feb. 9, 1954  H. SCHRÖDER  2,668,478
HEAT PROTECTION FILTER
Filed Dec. 14, 1949
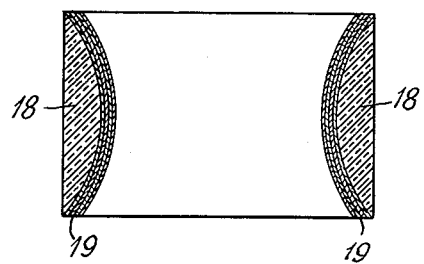
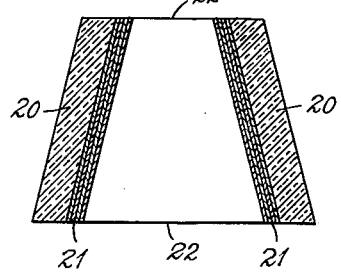
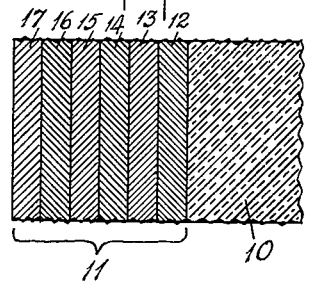
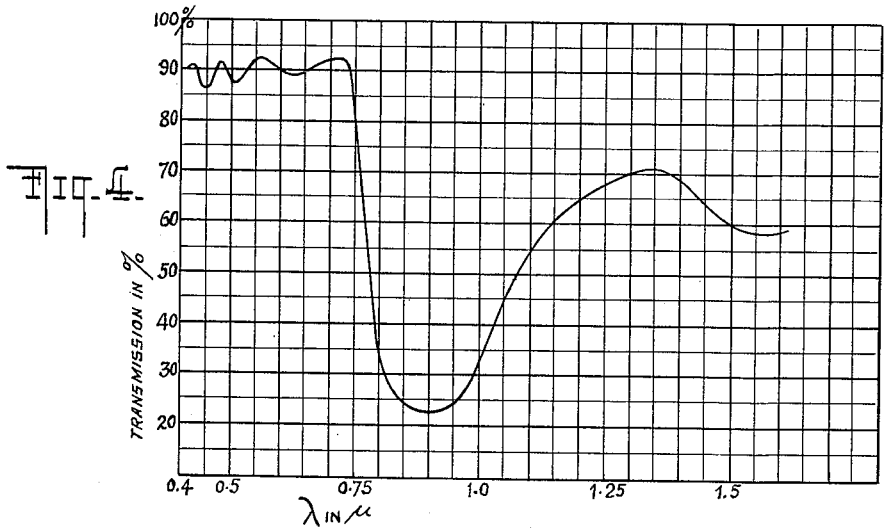
INVENTOR.
HUBERT SCHRODER
BY
ATTORNEY

UNITED STATES PATENT OFFICE 2,668,478

HEAT PROTECTION FILTER

Hubert Schröder, Munich, Germany, assignor to
Fish-Schurman Corporation, New York, N. Y.,
a corporation of New York Application December 14, 1949, Serial No. 132,875

5 Claims. (Cl. 88—109)

This invention relates to filters for protecting heat sensitive parts from the heat rays emitted by light sources.

The production of intense light radiation such as is used for example in optical projection, causes the development of a strong heat radiation in most of the prevailing light sources, said heat radiation constituting usually the largest part of the emitted energy. Such heat radiation may, for instance, be so high, even in electric lamps of comparatively low wattage, that it is imperative to protect heat sensitive parts located in the light path or in the proximity of the lamp, from overheating. The same problem of heat protection also occurs often in connection with ultraviolet rays, i. e., mercury vapor lamps. Air or water cooling of the objects which are to be protected, is in many cases unfeasible, not only for reasons of economy, but especially because in the case of high absorbing objects, i. e., photographic films, cooling is too ineffective. It has been heretofore attempted therefore, to collect the damaging radiation mostly in advance of the objects by the use of proper heat ray absorbent means. For this purpose solutions or special glasses are generally employed, said means having the highest possible absorption capacity in the infra-red, and their thickness, measured along the ray path dependent upon the amount of the incident heat radiation and the permissible limit of the emergent heat radiation. These heat ray absorbent means possess however, several disadvantages. In the case of strong radiation which requires a corresponding increased thickness, the glasses may easily crack due to the developed heat and for this reason, such glasses are mostly used in subdivided strips. The elimination of the heat absorbed by such means also often requires special additional arrangements. The main disadvantage of all such heat protection filters however, lies in the incomplete transparency which they exhibit also in the visible spectrum. As an instance, glass thicknesses of only a few millimeters may result in 50% and more light absorption. Furthermore, said light absorption is not evenly distributed over the spectrum and consequently often causes an undesirable discoloring of the light. For these reasons, the use of lamps of higher capacity in projection results in comparatively little advantage for the optical field in most cases.

An object of the present invention is to provide an improved heat protection filter which shall be free of the above mentioned disadvantages.

Another object of the invention is to provide a heat protection filter which will eliminate substantially all of the undesired heat radiation by reflection.

Other objects as well as the advantages of the invention, will become apparent after a perusal of the following description when read in connection with the accompanying drawings in which Fig. 1 is a greatly enlarged sectional view of a transparent body provided with a heat filter system in accordance with the invention; Fig. 2 is a sectional view of a condenser made according to the invention; Fig. 3 is a sectional view of a double filter embodying the features of the invention and Fig. 4 is a graph showing the transmission characteristics of the heat filter.

In Fig. 1 of the drawings, the numeral 10 designates the filter support which may be made of glass or other suitable transparent material. The filter, generally designated 11, consists of a system of non-metallic interference layers of negligible absorption and of different refractive indices which are deposited on the appropriate transparent support 10. The optical thickness of each of the layers in the filter depends on the spectral distribution of the radiation source, and should be on the one hand, about one-quarter, or an odd multiple of one-quarter, of the wave length of the maximum emitted heat radiation. On the other hand, said thickness of each of the layers should also conform to the requirements of the visible part of the spectrum to be passed therethrough by corresponding to about half the wave length of the center of this region. Thus, suppose for example, that the maximum heat radiation of a certain incandescent lamp is at a wave length of 1100 millimicrons. If layers having an optical thickness of one-quarter of the wave length of 1100 millimicrons are deposited on the support 10, they each shall conform to an optical thickness of one-half wave length at 550 millimicrons which is in the middle of the visible spectrum. The greater the difference in the refractive index of each two successive layers, the less the number of layers required. In most cases, four to six layers are sufficient. In order to avoid discoloration, it is preferable not to choose all optical layer thicknesses exactly equal, but to arrange certain deviations between thicknesses which depend on the used materials. As a guide, the rule may be applied to make the low refractive layer about 10 to 20% optically thicker than the high refractive layer. Variations in thicknesses of successive layer pairs to the extent of the named percentage may also have the same effect.

In order to achieve high transparency in the visible and also in the ultraviolet region, it is recommended to choose a lower refractive index for the outermost layer bordering on air than for the preceding layer, and the thickness of such outer layer should be adjusted to one-quarter of the wave length for the corresponding spectral region of maximum transparency. Thus, in the above illustration, the thickness of the outer layer should be one-quarter wave length at 550 millimicrons, or one-eighth wave length at 1100 millimicrons. Transparencies are thereby achieved which are not or hardly lower than those of the uncoated glass surface, with almost complete absence of discoloration. If the layer system does not border on air, but on another medium, the refractive index of the outer layer should be preferably between that of the preceding layer and that of the outer medium.

Any none or weakly absorbing substance is suitable as layer material, whereby the choice depends on the method of coating. For application of the materials by evaporation in high vacuum, the following may be used: Fluorides of alkaline earth, such as magnesium fluoride, calcium fluoride, or cryolite as low refracting layers and zinc sulphide or heavy metal chlorides such as lead chloride, thallium chloride and silver chloride, as high refractive layers. Also usable as high refractive layers are oxides of metals like titanium, bismuth, tellurium, etc. However, if the layers are precipitated in the form of a liquid or gas, suitable silicic acid and titanium dioxide layers, as known in the optical treating technique, can be used with success. If the outer layer is to border on air, the choice falls primarily on materials of sufficient mechanical or chemical stability.

An example of a filter conforming to the foregoing and transmitting more than 90% of the visible, and reflecting 50% of the infra-red radiation is as follows:

Referring to Fig. 1 of the drawings, the filter 11 provided on the glass support 10 is shown as consisting of six layers, 12, 13, 14, 15, 16 and 17. Layers 12, 14 and 16 are composed of zinc sulphide, while layers 13, 15 and 17 are magnesium fluoride coatings. The zinc sulphide layers 12, 14 and 16 are each one-half of a wave length ($\lambda = 550$ m$\mu$) thick. The magnesium fluoride layers 13 and 15 are each approximately nine-sixteenths of a wave length (at 550 m$\mu$) thick, in order that the transmission appear uncolored. The top or outer layer 17 is one-quarter wave length (at 550 m$\mu$) thick in order that transmission in the visible region should be at a maximum. Instead of magnesium fluoride, the top layer may be made of CeF$_3$ or ThOF$_2$ to equal advantage. If a very smooth and scratchproof surface is desired beryllium oxide may be utilized as the top layer 17.

The thickness of the several coatings or layers in the filter 11 may be determined photometrically. In measuring photometrically the reflectivity of a filter with a selenium cell with approximate eye sensitivity curve, the needle of the galvanometer should go to the maximum with a zinc sulphide coating, and thereafter gradually return to the minimum. The deciding factor however, is the appearance of a blue reflex color if inspected at a vertical position with a matte incandescent bulb. The last zinc sulphide layer 16 should in case magnesium fluoride is used as the top layer 17, as in the above example, only be evaporated to a blue-greenish color (always looking towards the plate on which all the layers are deposited). In the case where beryllium oxide is used as the top layer 17, the last zinc sulphide layer should only be evaporated to a violet color. The intermediate MgF$_2$ layers 13 and 15 are controlled with the photometer, and the needle deflection should always go back to the minimum of reflection and beyond the latter by one-tenth of a graduation from the range of maximum to the minimum. The final layer 17 of MgF$_2$ should also be controlled with the photometer and to the first minimum of the galvanometer deflection. With the use of CeF$_3$ and ThOF$_2$ as the top layer, the same procedure should be followed as for the MgF$_2$. When beryllium oxide is used as the last layer 17, it should be evaporated to a blue reflecting color.

The completed filter should be free from all color; Fig. 4 showing the transmission characteristics of a zinc sulphide/magnesium fluoride filter without protection and with no reflection reducing coating on the back surface of the filter. The coated surface of the filter should not have more than 10% reflection in the case of BeO, and with an MgF$_2$ top layer 17 not more than 4 to 5% within the visible (measured with a photocell with approximate eye sensitivity distribution). In the infra-red region, as passed by an ordinary piece of glass (obtained with an incandescent lamp using Schott RG-7 filter), the reflectivity should be at least 40%. The stability (mechanical resistance) of the filter should be such that it can be rubbed with a cloth without causing damage. The resistance of an MgF$_2$ filter can be considerably increased, especially against moisture, by annealing for several hours at 150 to 200° C. (slowly cooling, otherwise, the layers will snap off).

If a reflection of a somewhat narrower band in the infra-red is desired, one should use seven or nine layers instead of the five layers designated 12, 13, 14, 15 and 16, in Fig. 1 of the drawings, with a spectrally adjusted thickness. Furthermore, since the reflection of the infra-red radiation by the heat protection filter 11 runs in a bell-shaped curve, its effectiveness may be further increased if, instead of one such filter, two or more of them are mounted successively. The most favorable effect is achieved if the filters are not arranged parallel to each other, but if they are tilted at a slight angle at suitable distances so that plural reflections are eliminated. Preferably, the individual filter systems are not exactly alike, but are synchronized by minor differences in thickness so that small transparency differences in the individual colors are thereby reciprocally compensated.

When condensers are used, it is preferred to coat one or several of the condenser surfaces with the described filter system, since this results in no or almost no light absorption. Fig. 2 shows a condenser consisting of two lenses 18, 18, said condenser being coated on both curved inner surfaces with the heat filter systems 19, 19, such as hereinabove described. Another embodiment of a double filter is shown in Fig. 3. It consists of two glass plates 20, 20, which are slightly inclined toward each other, said glass plates being coated with the hereinabove described layer systems 21, 21, and held in setting or mount 22. An effective dispersion of heat rays which have been reflected several times, is thus obtained.

It is obvious that the hereinabove described layer systems may also advantageously be used as an infra-red reflector (infra-red mirror), particularly for the reflection of narrow spectral regions, if the materials and thicknesses of the layers are suitably chosen.

I claim:

1. A color free, heat protection filter having high reflection in the infra-red region and substantially complete transparency in the visible part of the spectral range of the radiation source, comprising a transparent supporting body and a transparent infra-red reflector consisting of a plurality of layers superimposed on at least one of the surfaces of said supporting body, alternate layers of said reflector being of material having a high index of refraction and the remaining layers of said reflector having a low index of refraction, a layer of high index of refraction being adjacent to said supporting body, each of the layers of said reflector located between the supporting body and the outer layer of said reflector adjacent to the outer medium being constituted of non-metallic material of negligible absorption, the optical thickness of the layers of one refractive index located between the supporting body and the outer layer differing from the optical thickness of the layers of the other refractive index located between the supporting body and the outer layer by a predetermined amount not exceeding 20%, and the optical thickness of each of such layers of the other refractive index being about one-quarter of the wave length of the maximum emitted heat radiation of the radiation source and about one-half of the wave length of the medium wave length of the visible spectral range to be transmitted, the outer layer of said reflector having an index of refraction between the indexes of refraction of the layer immediately next to such outer layer and the outer medium, and having an optical thickness of about one-quarter of the medium wave length of the visible spectral range to be transmitted.

2. A heat protection filter such as set forth in claim 1, wherein the layers of low index of refraction are composed of at least one substance selected from the group consisting of fluorides of alkaline earth, silicic acid, thorium oxyfluoride and cryolite, and wherein the layers of high index of refraction are composed of at least one substance selected from the group consisting of ZnS, heavy metal chlorides and oxides of titanium, bismuth and tellurium.

3. A color free, heat protection filter having high reflection in the infra-red region and substantially complete transparency in the visible part of the spectral range of the radiation source, comprising a transparent supporting body having two surfaces in opposed relation, a transparent infra-red reflector consisting of two layer systems disposed in spaced relation and each superimposed on one of said surfaces of said supporting body, each of said systems consisting of a plurality of layers of which alternate layers are constituted of non-metallic material of negligible absorption and have a high index of refraction and the remaining layers of each of said systems being constituted of non-metallic material of negligible absorption and having a low index of refraction, a layer of high index of refraction in each of said systems being adjacent to said supporting body, the optical thickness of the layers of one refractive index located between the supporting body and the outer layer adjacent to the outer medium in each system differing from the optical thickness of the layers of the other refractive index located between the supporting body and the outer layer in such system by a predetermined amount not exceeding 20%, and the optical thickness of each of such layers of the other refractive index in each of said systems being about one-quarter of the wave length of the maximum emitted heat radiation of the radiation source and about one-half of the wave length of the medium wave length of the visible spectral range to be transmitted, the outer layer of each system having an index of refraction between the indexes of refraction of the layer immediately next to such outer layer and the outer medium and having an optical thickness of about one-quarter of the medium wave length of the visible spectral range to be transmitted.

4. A heat protection filter such as set forth in claim 3, wherein said two layer systems of said reflector are arranged in non-parallel relation to each other.

5. A heat protection filter such as set forth in claim 3 wherein said layer systems of said reflector differ from each other by the different optical thickness of at least one layer in each system.

HUBERT SCHRÖDER.

References Cited in the file of this patent

UNITED STATES PATENTS

| Number | Name | Date |
|---|---|---|
| 1,425,967 | Hoffman | Aug. 15, 1922 |
| 2,420,168 | Dimmick | May 6, 1947 |
| 2,478,385 | Gaisler | Aug. 9, 1949 |

OTHER REFERENCES

Banning: "Practical Methods of Making and Using Multilayer Fllters," article in Journal of the Optical Society of America, October 1947, vol. 37, No. 10, pages 792 through 797, published by American Institute of Physics, New York, New York.